(12) United States Patent
Ghukasyan

(10) Patent No.: US 6,996,567 B2
(45) Date of Patent: Feb. 7, 2006

(54) AUTOMATIC GENERATION OF JOIN GRAPHS FOR RELATIONAL DATABASE QUERIES

(75) Inventor: Hovhannes Ghukasyan, Mountain View, CA (US)

(73) Assignee: Heuristic Physics Laboratories, Inc., San Jose, CA (US)

( * ) Notice: Subject to any disclaimer, the term of this patent is extended or adjusted under 35 U.S.C. 154(b) by 400 days.

(21) Appl. No.: 09/871,484

(22) Filed: May 31, 2001

(65) Prior Publication Data

US 2002/0184225 A1    Dec. 5, 2002

(51) Int. Cl.
G06F 7/00       (2006.01)
(52) U.S. Cl. .................... 707/100; 707/4; 707/2
(58) Field of Classification Search ........ 707/100–102, 707/1–10, 200; 704/7; 715/500
See application file for complete search history.

(56) References Cited

U.S. PATENT DOCUMENTS

| | | | | |
|---|---|---|---|---|
| 5,519,859 | A * | 5/1996 | Grace | 707/3 |
| 5,546,576 | A | 8/1996 | Cochrane et al. | 395/600 |
| 5,701,460 | A * | 12/1997 | Kaplan et al. | 707/3 |
| 5,748,188 | A | 5/1998 | Hu et al. | 345/326 |
| 5,758,335 | A * | 5/1998 | Gray | 707/2 |
| 5,864,842 | A * | 1/1999 | Pederson et al. | 707/3 |
| 5,873,075 | A | 2/1999 | Cochrane et al. | 707/2 |
| 5,930,785 | A * | 7/1999 | Lohman et al. | 707/2 |
| 6,052,687 | A * | 4/2000 | Miura et al. | 707/100 |
| 6,105,020 | A * | 8/2000 | Lindsay et al. | 707/2 |
| 6,618,718 | B1 * | 9/2003 | Couch | 707/2 |
| 6,665,682 | B1 * | 12/2003 | DeKimpe et al. | 707/101 |
| 6,721,754 | B1 * | 4/2004 | Hurst et al. | 707/102 |
| 2002/0188600 | A1 * | 12/2002 | Linsay et al. | |

* cited by examiner

Primary Examiner—Greta Robinson
Assistant Examiner—Miranda Le
(74) Attorney, Agent, or Firm—Sierra Patent Group, Ltd.

(57) ABSTRACT

A method is described for automatic generation of join graphs for relational database queries. The method includes marking instances of tables in a hierarchical representation of a database schema according to a selection procedure that processes tables in an input list having single occurrences in the hierarchical representation, multi-dimensional tables in the input list having multiple occurrences in the hierarchical representation, one-dimensional tables in the input list having multiple occurrences in the hierarchical representation that reference the multi-dimensional tables and have one of the multi-dimensional tables as a parent in the hierarchical representation, and any remaining one-dimensional tables in the input list having multiple occurrences in the hierarchical representation. The hierarchical representation is configured using expert knowledge of the database usage.

1 Claim, 10 Drawing Sheets

US 6,996,567 B2

AUTOMATIC GENERATION OF JOIN GRAPHS FOR RELATIONAL DATABASE QUERIES

FIELD OF THE INVENTION

The present invention generally relates to techniques for performing relational database queries and in particular, to a method for automatic generation of join graphs for relational database queries.

BACKGROUND OF THE INVENTION

Conventional relational database languages generally require users to specify all tables participating in a database query and the join conditions that link those tables into a join graph. To do this, users should be familiar with the database schemas and understand the relationships between tables in the databases. Although query tools are available that provide users with database schema information and support graphical ways of linking tables into a join graph for database queries, these tools do not automatically generate join graphs for users, except under very limited conditions. Thus, performing database queries continues to be difficult for users in general, especially in applications involving complex database schemas.

OBJECTS AND SUMMARY OF THE INVENTION

Accordingly, an object of the present invention is to provide a method for automatic generation of join graphs for relational database queries.

Another object of the present invention is to provide a method for automatic generation of join graphs for relational database queries that requires no special knowledge of the database schema or the relationships between tables in the database by a user initiating a query of the database.

Another object of the present invention is to provide a method for automatic generation of join graphs for relational database queries that is generally applicable and not limited to particular database applications.

Still another object of the present invention is to provide a method for automatic generation of join graphs for relational database queries that performs such generation efficiently in an interactive user environment.

These and additional objects are accomplished by the various aspects of the present invention, wherein briefly stated, one aspect is a method for automatic generation of join graphs for relational database queries, comprising: (a) receiving an input list of tables including attributes of interest for a database query; (b) marking instances of tables of the input list having single occurrences in an hierarchical representation of a database schema, and marking ancestors of the instances of tables according to the hierarchical representation; (c) marking unmarked instances of multi-dimensional tables of the input list closest to marked instances, marking ancestors of the unmarked instances of the multi-dimensional tables according to the hierarchical representation, and marking unmarked instances of one-dimensional tables that reference the multi-dimensional tables and have the unmarked instances of the multi-dimensional tables as parents according to the hierarchical representation; (d) marking unmarked instances of one-dimensional tables of the input list closest to marked instances, and marking ancestors of the unmarked instances of the one-dimensional tables according to the hierarchical representation; and (e) generating a join graph corresponding to the input list from the marked instances in the hierarchical representation.

Preferably, the hierarchical representation is configured so as to make use of an expert's knowledge of the anticipated usage of the database. Rules to design the hierarchical representation include: starting with the most frequently used tables; attaching other tables to those tables according to their relationships or dependencies; minimizing the number of instances of the same table; and fine-tuning the hierarchical representation by using it with the invented method to see if it is efficiently providing correct results for typically expected queries, and modifying the hierarchical representation as appropriate in light of such fine-tuning efforts.

Additional objects, features and advantages of the various aspects of the invention will become apparent from the following description of its preferred embodiments, which description should be taken in conjunction with the accompanying drawings.

DETAILED DESCRIPTION OF THE PREFERRED EMBODIMENT

Figure 1:
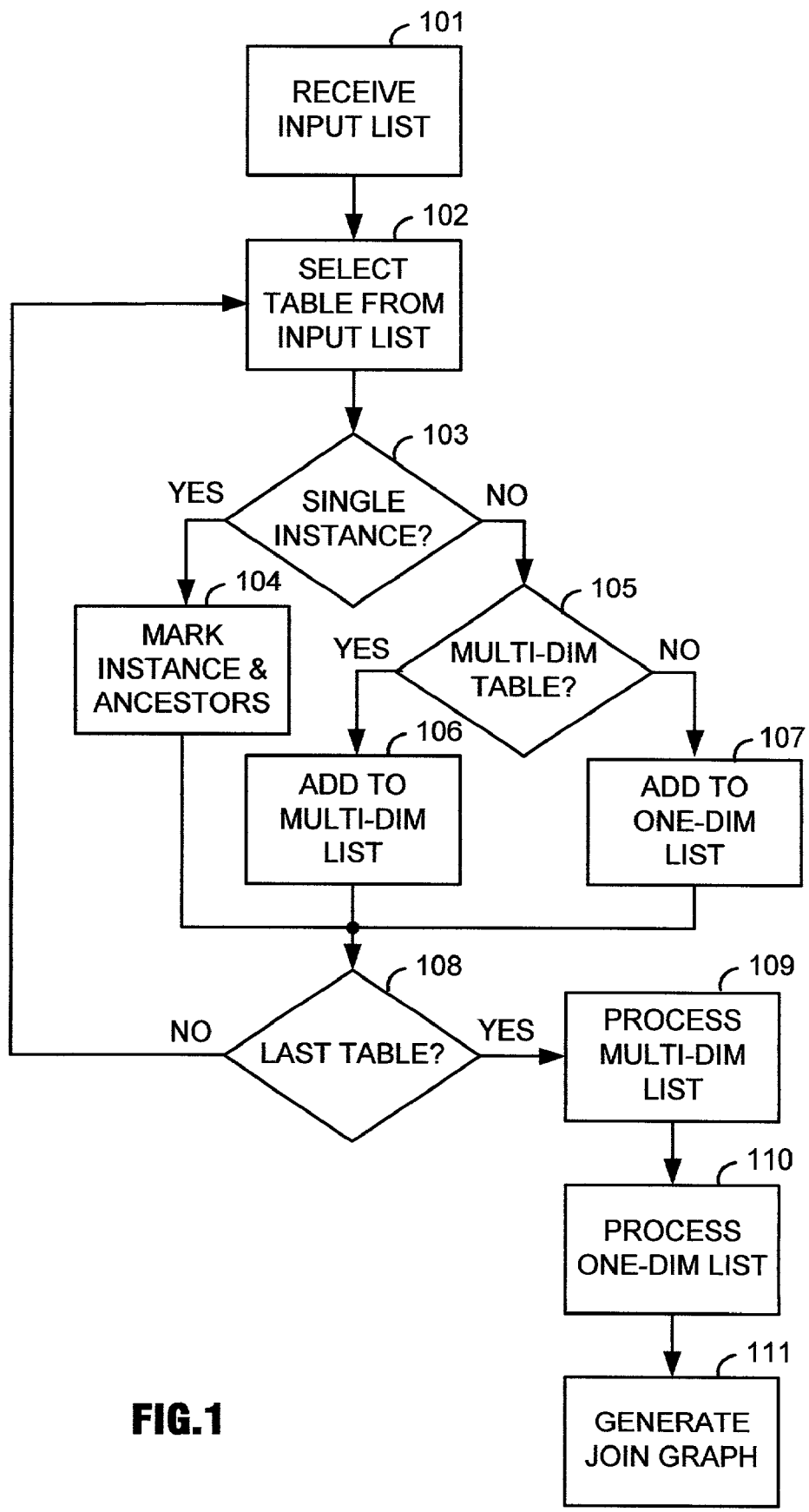
FIG. 1 illustrates, as an example, a flow diagram of a method for automatic generation of join graphs for relational database queries, utilizing aspects of the present invention.

FIG. 1 illustrates, as an example, a flow diagram of a method for automatic generation of join graphs for relational database queries. The method employs a hierarchical representation of the database schema, and information about the dimensions of its tables. A feature of the method is its general applicability in that it makes no assumptions about the database schema. Another feature of the method is that it does not require its users to be familiar with database schemas or understand all the relationships between tables in the database.

In 101, a computer system performing the method receives an input list of tables that is provided by a user initiating a database query. The input list contains attributes of interest, i.e., those that the user wants as output and those to be used for filtering. In 102, a first table is selected for processing from the list of tables. In 103, if the table occurs as only a single instance in a hierarchical representation of the database schema, then in 104, that instance is marked for inclusion in the join graph, and so are all instances of its ancestors according to the hierarchical representation. The method then proceeds to 108.

On the other hand, if the table has more than one instance in the hierarchical representation, then in 105, information about the database schema is checked to see if the table being processed is a multi-dimensional table. As used herein, a table is referred to as being a multi-dimensional table if it is dependent upon more than one other table in the database schema. The depended upon tables are referred to as being reference tables or dimensions. If a table is dependent upon only one other table, then it is referred to as being a one-dimensional table.

If it is determined that the table being processed is a multi-dimensional table, then, in 106, its table name is added to a multi-dimensional list. On the other hand, if it is determined that it is not a multi-dimensional table, then it must be a one-dimensional table by default, so in 107, its table name is added to a one-dimensional list. After either case, the method then proceeds to 108.

In 108, the input list is checked to determine if the table currently being processed by the method is the last table in the input list. If it is not the last table, then the method jumps back to 102, repeating 102~108 for each table in the input list. If it is the last table, then all tables in the input list have been processed through 102~108, and the method proceeds to 109 and 110, wherein the multi-dimensional and one-dimensional lists are respectively processed to mark additional instances in the hierarchical representation for inclusion in the join graph. In 111, the join graph is then generated from all the marked instances in the hierarchical representation.

Figure 2:
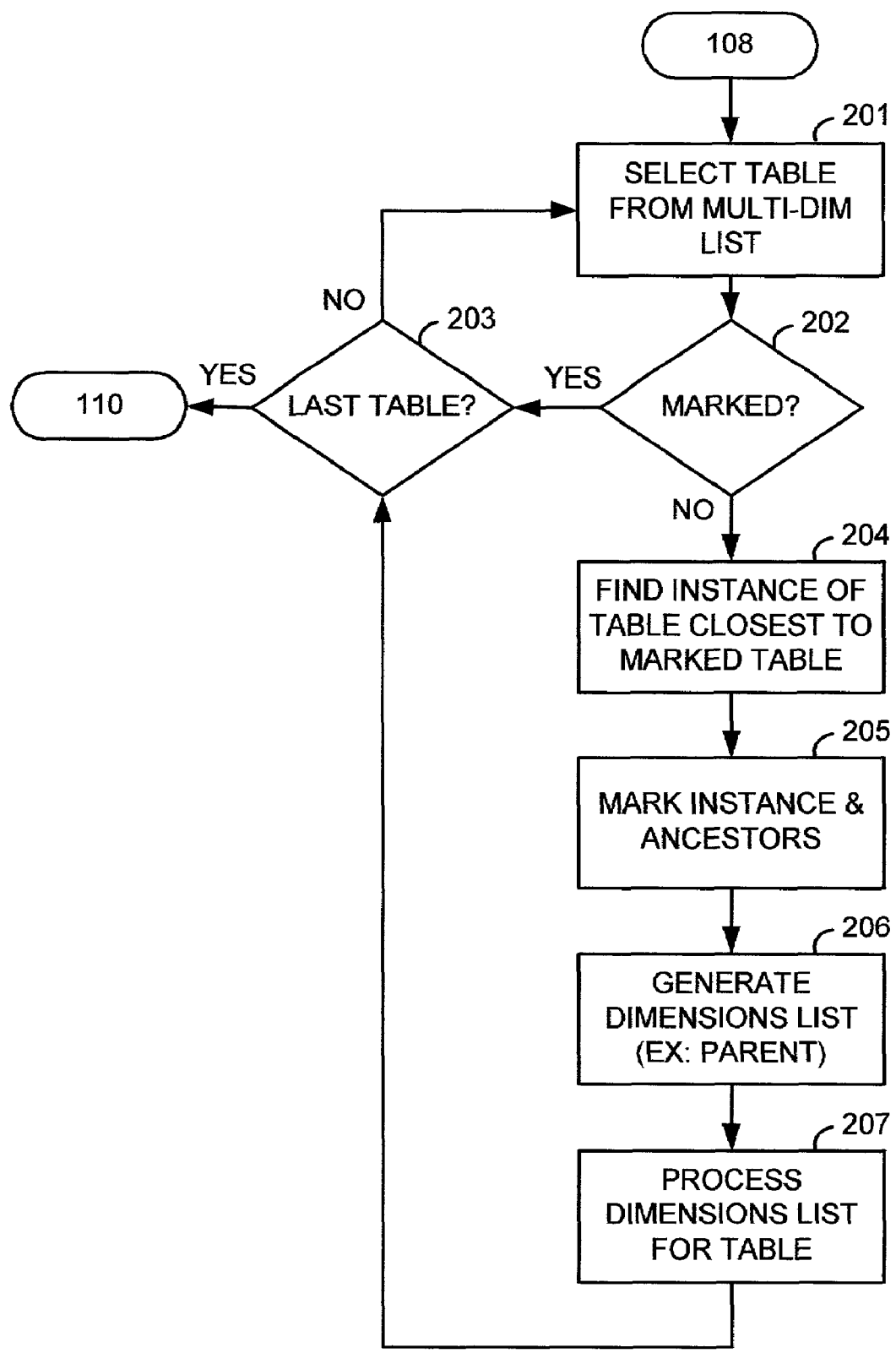
FIG. 2 illustrates, as an example, a flow diagram for processing a list of multi-dimensional tables in the method for automatic generation of join graphs for relational database queries, utilizing aspects of the present invention.

FIG. 2 illustrates, as an example of 109 in FIG. 1, a flow diagram for processing the list of multi-dimensional tables in the method for automatic generation of join graphs for relational database queries. In 201, a multi-dimensional table in the multi-dimensional list is selected for processing. In 202, the hierarchical representation is checked to see if an instance of the multi-dimensional table is already marked. If there are no instances of the multi-dimensional table already marked, then in 204, an instance of the multi-dimensional table that is a closest child in relationship to a marked table in the hierarchical representation is found. In 205, that instance is marked along with instances of its ancestors according to the hierarchical representation for inclusion in the join graph. In 206, a list of dimensions is generated for the multi-dimensional table being processed. Included in the dimensions list are all reference tables or dimensions of the multi-dimensional table, except for its parent (which has already been marked in 205) according to the hierarchical representation. In 207, the dimensions list is then processed to mark instances of certain reference tables or dimensions in the hierarchical representation for inclusion in the join graph. The method then proceeds to 203.

The method also proceeds to 203, if there is an instance of the multi-dimensional table that is marked in the hierarchical representation. In 203, the method determines whether the multi-dimensional table currently being processed is the last table in the multi-dimensional list. If it is the last table, then processing of the multi-dimensional list is completed, and the method goes back to 110 in FIG. 1. However, if it is not the last table, then the method jumps back to 201, repeating 201~207 for each multi-dimensional table in the multi-dimensional list.

Figure 3:
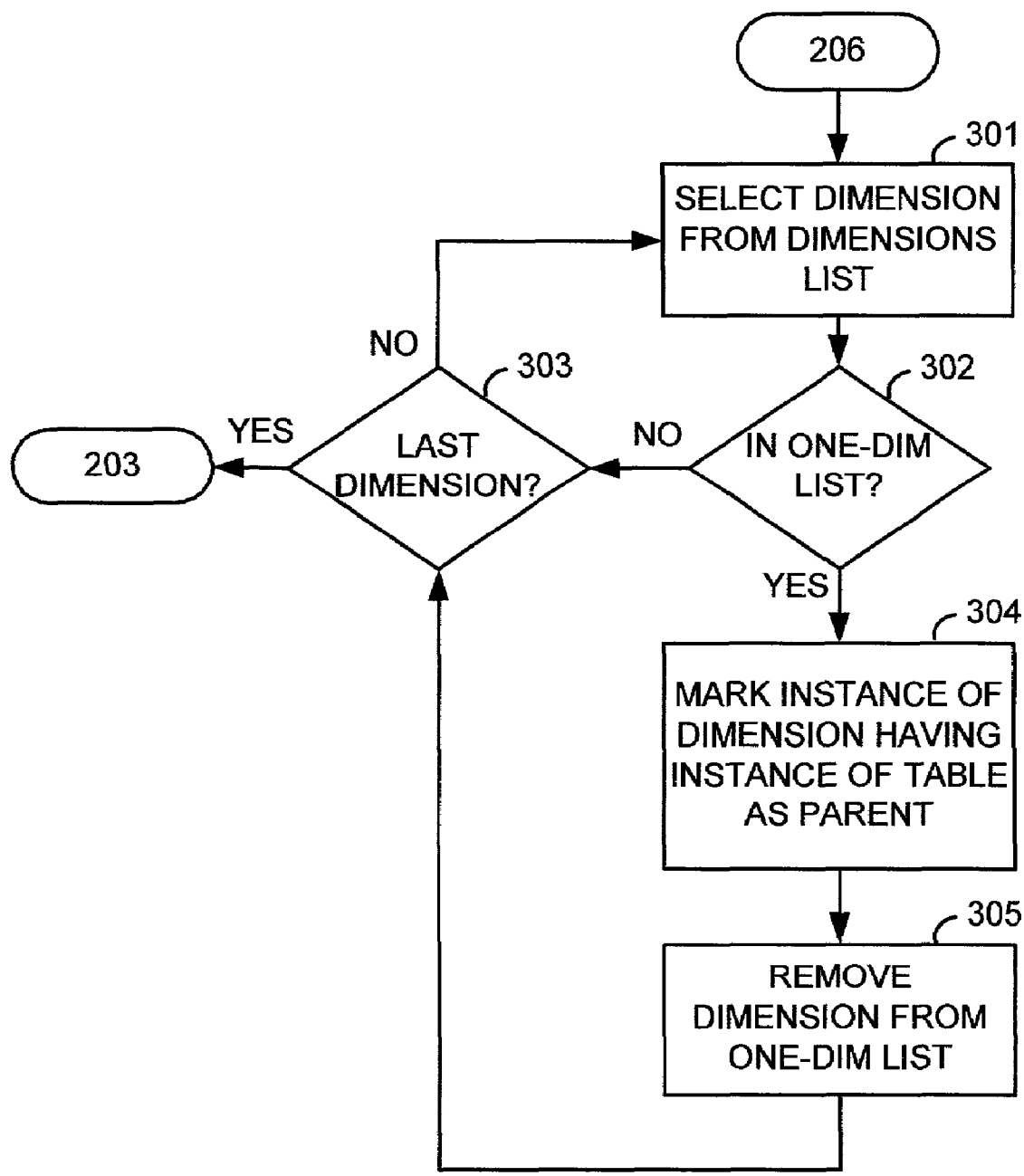
FIG. 3 illustrates, as an example, a flow diagram for processing a list of dimensions for a multi-dimensional table in the method for automatic generation of join graphs for relational database queries, utilizing aspects of the present invention.

FIG. 3 illustrates, as an example of 207 in FIG. 2, a flow diagram for processing a list of dimensions or reference tables for a multi-dimensional table in the method for automatic generation of join graphs for relational database queries. In 301, a reference table or dimension in the dimensions list is selected for processing. In 302, the one-dimensional list is checked to see if the reference table's name is included in the one-dimensional list. If it is, then in 304, an instance of the reference table that has the multi-dimensional table currently being processed by the method as its parent in the hierarchical representation, is found and marked for inclusion in the join graph. In 305, the table name of that reference table is then removed from the one-dimensional list. The process then proceeds to 303.

The process also proceeds to 303, if the table name read in 301 is found in 302 to not be in the one-dimensional list. In 303, the process determines whether the reference table currently being processed is the last reference table or dimension in the dimensions list. If it is, then processing of the dimensions list is completed, and the method goes back to 203 in FIG. 2. If it is not, however, then the process jumps back to 301, repeating 301~305 for each reference table or dimension in the dimensions list for the multi-dimensional table currently being processed by the method.

Figure 4:
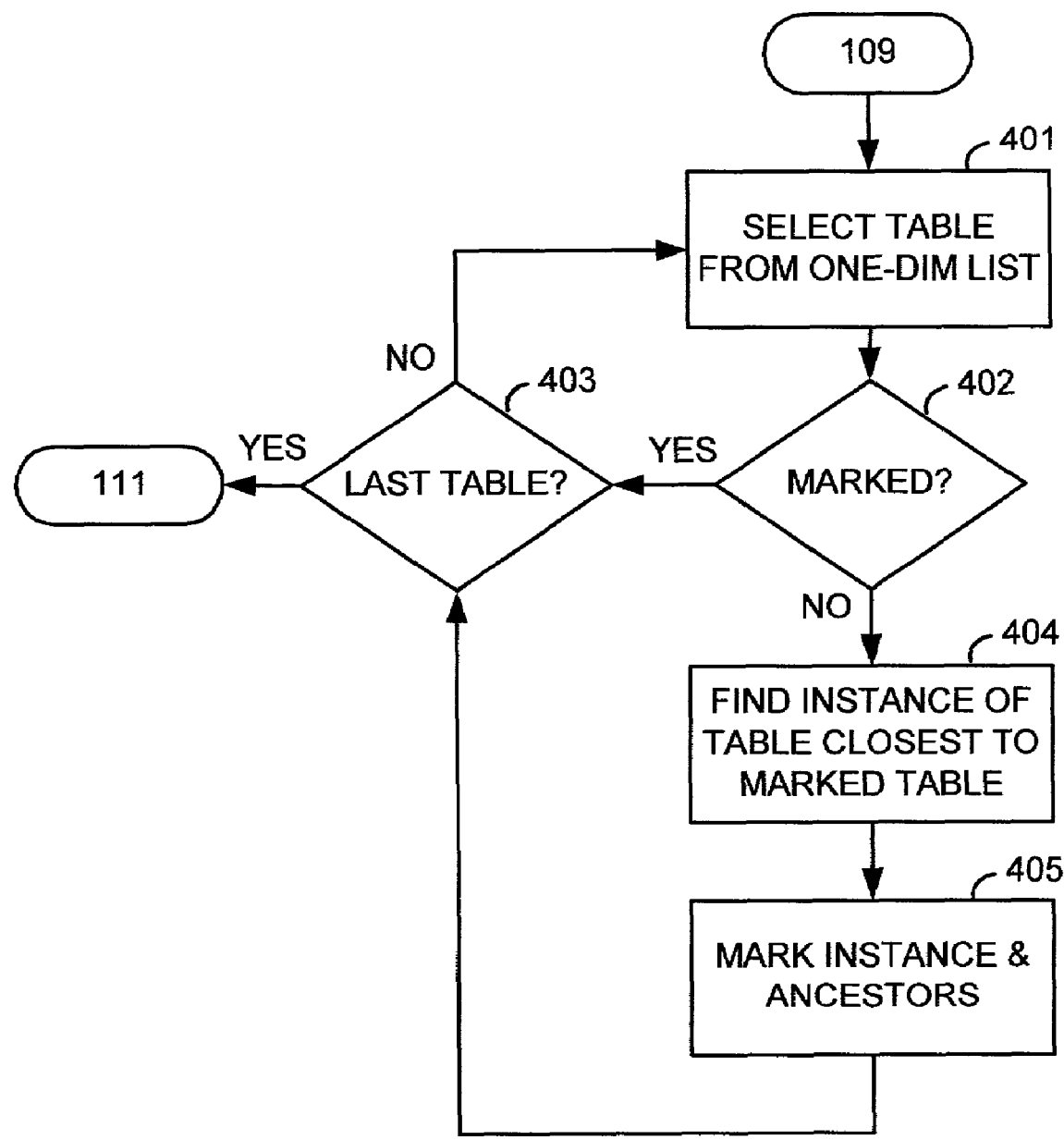
FIG. 4 illustrates, as an example, a flow diagram for processing a list of one-dimensional tables in the method for automatic generation of join graphs for relational database queries, utilizing aspects of the present invention.

FIGS. 4 illustrates, as an example of 110 in FIG. 1, a flow diagram for processing a list of one-dimensional tables in the method for automatic generation of join graphs for relational database queries. In 401, a one-dimensional table in the one-dimensional list is selected for processing. In 402, the hierarchical representation is checked to see if an instance of the one-dimensional table being processed is already marked. If there are no instances of the current one-dimensional table already marked, then in 404, an instance of the current one-dimensional table that is a closest child in relationship to a marked table in the hierarchical representation is found. In 405, that instance is marked along with instances of its ancestors in the hierarchical representation for inclusion in the join graph, and the process proceeds to 403.

The process also proceeds to 403, if it is determined in 402 that there is an instance of the current one-dimensional table that is marked in the hierarchical representation. In 403, the process determines whether the current one-dimensional table is the last table in the one-dimensional list. If it is, then processing of the one-dimensional list is completed, and the process jumps back to 111 in FIG. 1. If it is not, however, then the process jumps back to 401, repeating 401~405 for each table remaining in the one-dimensional list.

After generating the join graph for a relational database query, it is a simple matter to generate relational database language query instructions corresponding to the user query, since determining the join conditions that link the tables is straightforward. Accordingly, such details are omitted from the present description as being well known to those skilled in the art.

For optimal performance of the method for automatic generation of join graphs for relational database queries as described in reference to FIG. 1, the hierarchical representation is preferably configured by an expert who understands the expected usage of the database and defines the hierarchical representation at the system configuration time based upon that understanding, modifying it as necessary or desirable to reflect database schema changes and/or to achieve improved results from the method.

As is well known, there are multiple ways of representing a general graph with a hierarchy and that is the reason this requires knowledge of the particular database and its actual or expected usage. Normally, the hierarchy would follow the natural hierarchy of the objects in the domain. If there are several hierarchies in the domain (and the corresponding schema), it usually makes sense to put the most frequently used one as the basis for the representation. But the representation does not need to follow actual hierarchies (and usually does not). It does not depend on the type of relationships between the objects (tables). In other words, if there is 1:M (parent-child) relationship between tables A and B, that does not affect relative positions of tables A and B in the hierarchy.

Figure 5:
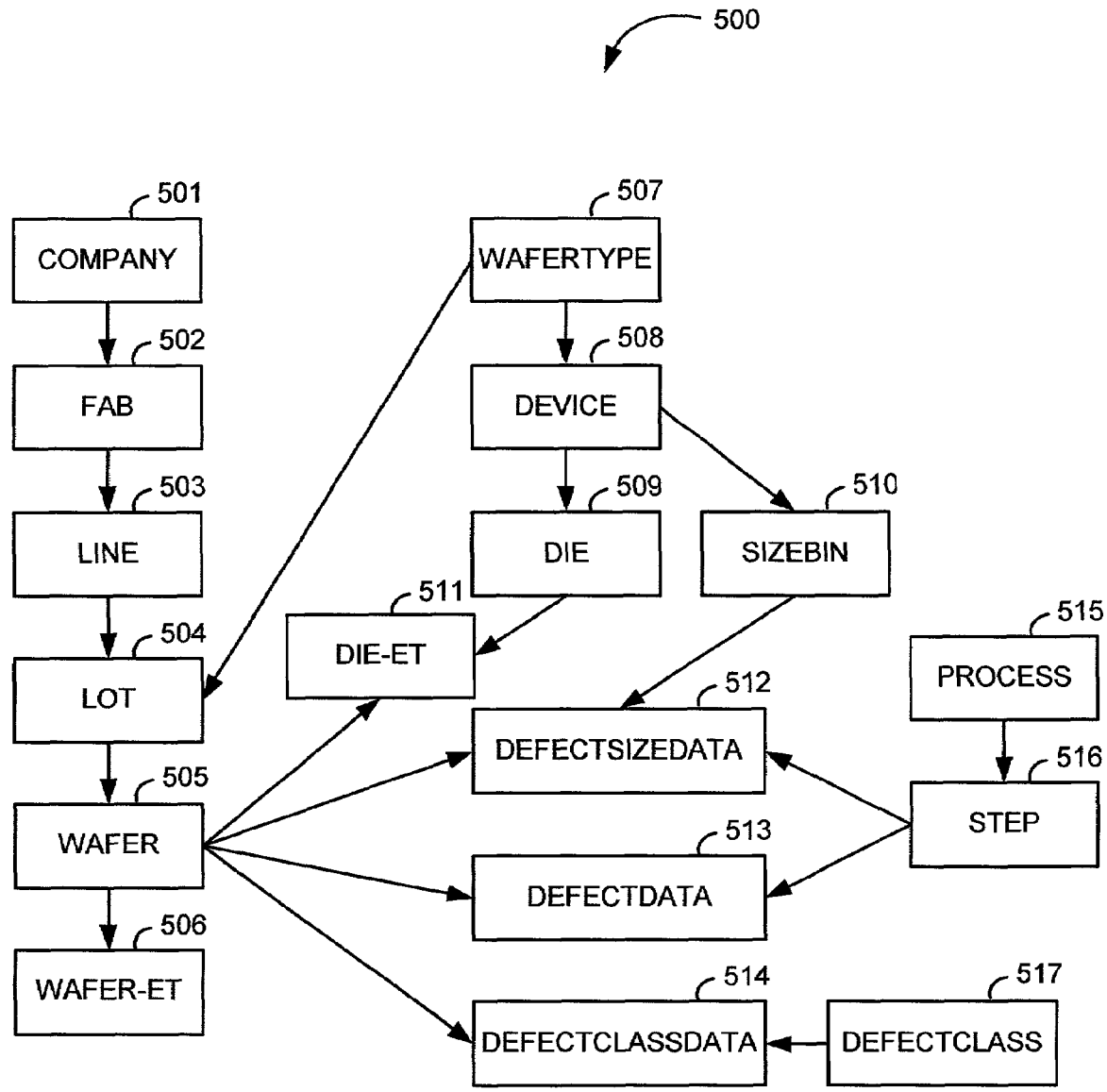
FIG. 5 illustrates, as a simple example, a dependency graph depicting relationships between tables for a database schema.
Figure 6:
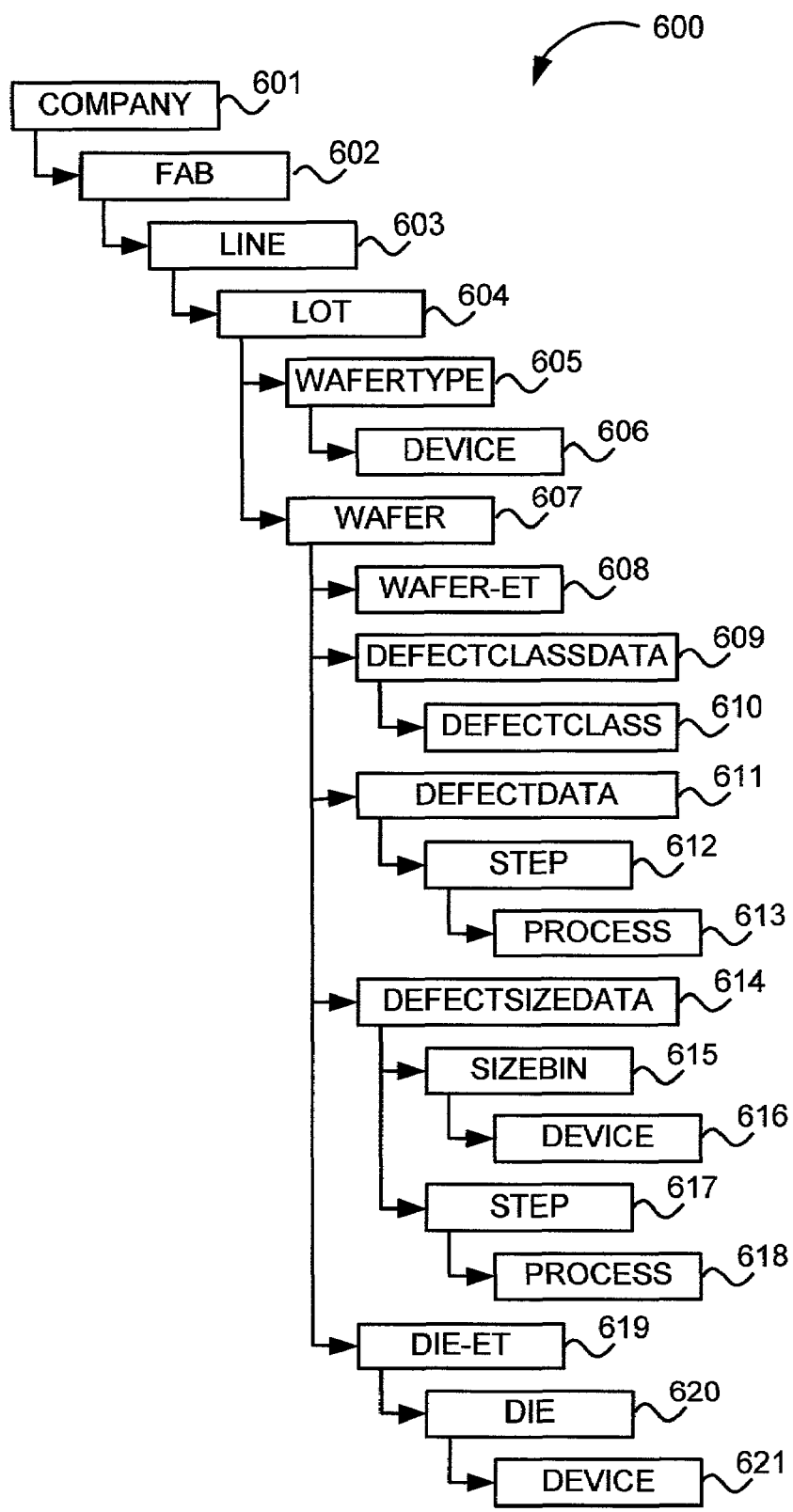
FIG. 6 illustrates, as an example, a hierarchical representation for the database schema of FIG. 5 following its natural hierarchy.
Figure 7:
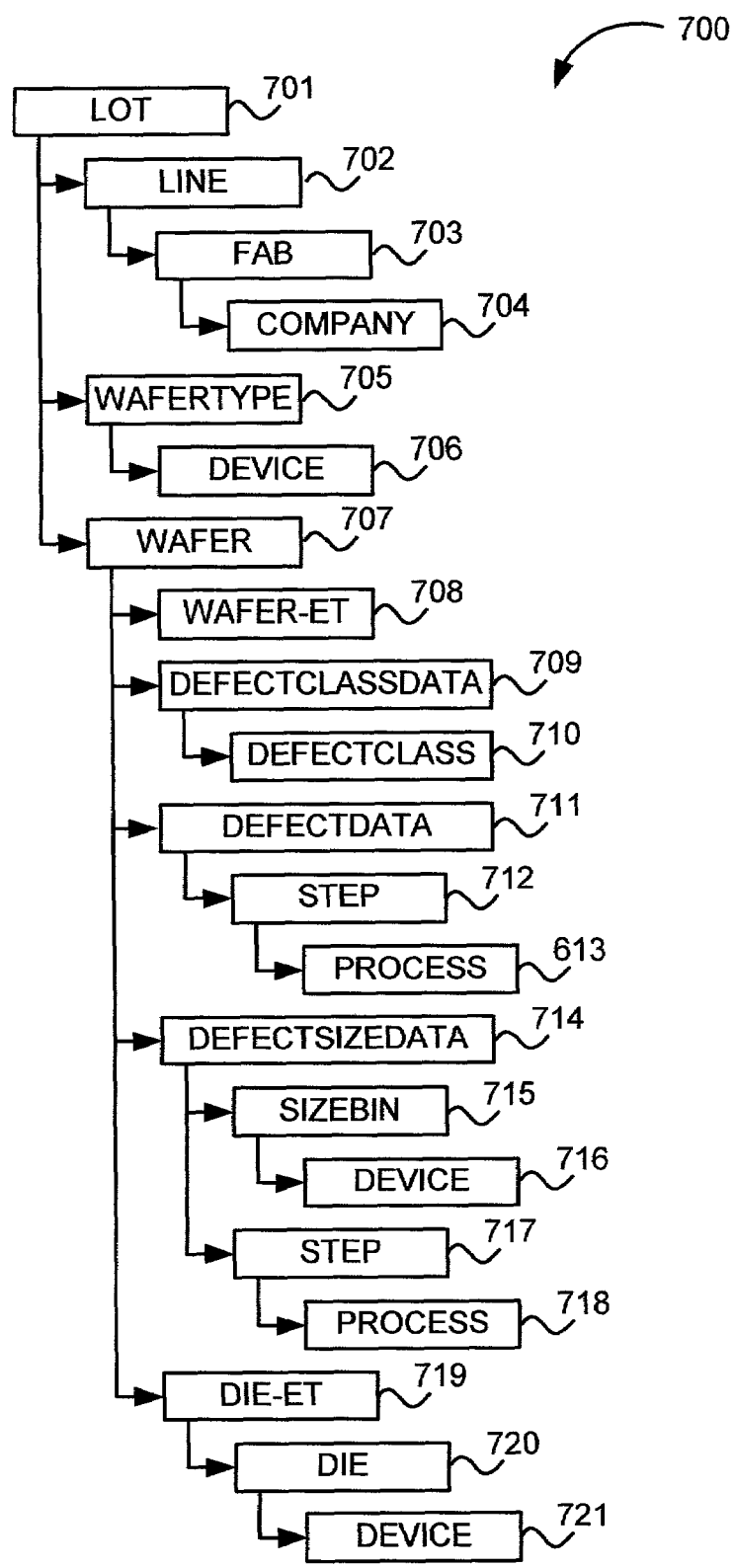
FIG. 7 illustrates, as an example, a preferable hierarchical representation for the database schema of FIG. 5 resulting from expert knowledge of its table usage in database queries.

To illustrate this, consider the database schema represented by the dependency graph depicting relationships between the tables in FIG. 5. Two possible hierarchical representations of this database schema are shown in FIGS. 6 and 7. In FIG. 6, a hierarchical representation is illustrated that directly follows the dependency graph's natural hierarchy, while in FIG. 7, a hierarchical representation is illustrated that results from expert knowledge of table usage in expected database queries by employing the empirical fact that most of the queries do not involve the tables named COMPANY, FAB and LINE.

In general, the rules to design the hierarchical representation include:

1. Start with the most frequently used tables in the database schema.
2. Attach other tables to those tables according to their relationships or dependencies.
3. Minimize the number of instances of the same table.
4. Fine-tune the hierarchical representation by using it with the invented method to see if it is efficiently providing correct results for expected queries, and modifying the hierarchical representation as appropriate in light of such fine-tuning efforts.

A couple of simple examples are now described to clarify the method for automatic generation of join graphs for relational database queries as described in reference to FIG. 1. The following examples employ information from the database schema depicted in FIG. 5, and its preferred hierarchical representation depicted in FIG. 7.

In the first example, in 101, an input set containing the tables named LOT, WAFER, STEP and DEFECTDATA is received. In 102, the table LOT is the first table selected from the input list for processing. Since the table LOT has only one instance 701 in the hierarchical representation 700, in 104, the instance 701 is marked. Since the instance 701 of the table LOT has no ancestors in the hierarchical representation 700, there are no ancestors to be marked in 104. In 108, it is determined that the table LOT is not the last table in the input list, so the method jumps back to 102 and selects the table WAFER to be processed.

In 103, the table WAFER is determined to have only one instance 707 in the hierarchical representation 700, so in 104, the instance 707 is marked. The instance 707 of the table WAFER has one ancestor, the instance 701 of the table LOT in the hierarchical representation 700. Since the instance 701 is already marked, there is no need to mark it again in 104. In 108, it is determined that the table WAFER is not the last table in the input list, so the method jumps back to 102 and selects the table STEP to be next processed.

In 103, the table STEP is determined to have two instances, 712 and 717, in the hierarchical representation 700. Therefore, the method processes the table through 105 instead of 104 in this case. In 105, the table STEP is determined to be a one-dimensional table according to the dependency graph 500 since it depends only from the table PROCESS. Accordingly, in 106, the table name of the table STEP is added to the one-dimensional list. In 108, it is determined that the table STEP is not the last table in the input list, so the method jumps back to 102 and selects the table DEFECTDATA to be next processed.

In 103, the table DEFECTDATA is determined to have only one instance 711 in the hierarchical representation 700, so in 104, the instance 711 is marked. The instance 711 of the table DEFECTDATA has two ancestors, the instance 707 of the table WAFER (parent) and the instance 701 of the table LOT (grandparent) in the hierarchical representation 700. Since these instances are already marked, there is no need to mark them again in 104. In 108, it is determined that the table DEFECTDATA is the last table in the input list, so the method now proceeds to 109.

In processing the tables of the input list through 102~108, no table names were added to the multi-dimensional list, and only the table name for the table STEP was added to the one-dimensional list. Therefore, since there are no table names in the multi-dimensional list in this case, 109 is skipped. The method proceeds to 110, which is detailed in 401~405 of FIG. 4.

In 401, the table STEP is selected from the one-dimensional list. In 402, it is determined that no instance of the table STEP is marked in the hierarchical representation 700. There are two unmarked instances, 712 and 717, of the table STEP. In 404, it is determined that the instance 712 of the table STEP is the closest child in relationship to another marked instance, which in this case, is the instance 711 of the table DEFECTDATA. Therefore, in 405, the instance 712 of the table STEP is marked. Since its ancestors, instances 711, 707 and 701 respectively for tables DEFECTDATA, WAFER and LOT have already been marked, there is no need to mark them again in 405. Since the table STEP is the only table in the one-dimensional list, in 403, it is determined that it is also the last table. The process then proceeds to 111. In 111, the join graph is then generated as being the chain of tables represented by instances 701, 707, 711 and 712 in the hierarchical representation 700.

In the second example, in 101, an input set containing the tables named LOT, STEP and DEFECTDATA is received. In 102, the table LOT is the first table selected from the input list for processing. Since the table LOT has only one instance 701 in the hierarchical representation 700, in 104, the instance 701 is marked. Since the instance 701 of the table LOT has no ancestors in the hierarchical representation 700, there are no ancestors to be marked in 104. In 108, it is determined that the table LOT is not the last table in the input list, so the method jumps back to 102 and selects the table STEP to be processed.

In 103, the table STEP is determined to have two instances, 712 and 717, in the hierarchical representation 700. Therefore, the method processes the table through 105. In 105, the table STEP is determined to be a one-dimensional table according to the dependency graph 500 since it depends only from the table PROCESS. Accordingly, in 106, the table name of the table STEP is added to the one-dimensional list. In 108, it is determined that the table STEP is not the last table in the input list, so the method jumps back to 102 and selects the table DEFECTDATA to be next processed.

In 103, the table DEFECTDATA is determined to have only one instance 711 in the hierarchical representation 700, so in 104, the instance 711 is marked. The instance 711 of the table DEFECTDATA has two ancestors, the instance 707 of the table WAFER (parent) and the instance 701 of the table LOT (grandparent) in the hierarchical representation 700. Since the instance 701 of the table LOT has already been marked, there is no need to mark it again in 104. However, the instance 707 of the table WAFER is unmarked. Therefore, in 104, the instance 707 is now marked. In 108, it is determined that the table DEFECTDATA is the last table in the input list, so the method now proceeds to 109.

In this example, the multi-dimensional list is empty and the one-dimensional list only contains the table name for the table STEP, as in the first example. Therefore, processing of 401~405 results in the same result as the first example, which is, the instance 712 of the table STEP being marked. In 111, the join graph is then generated as being the chain of tables represented by instances 701, 707, 711 and 712 in the hierarchical representation 700, which is the same join graph resulting in the first example, even though the table WAFER was not included in the input list of the second example.

Figure 8:
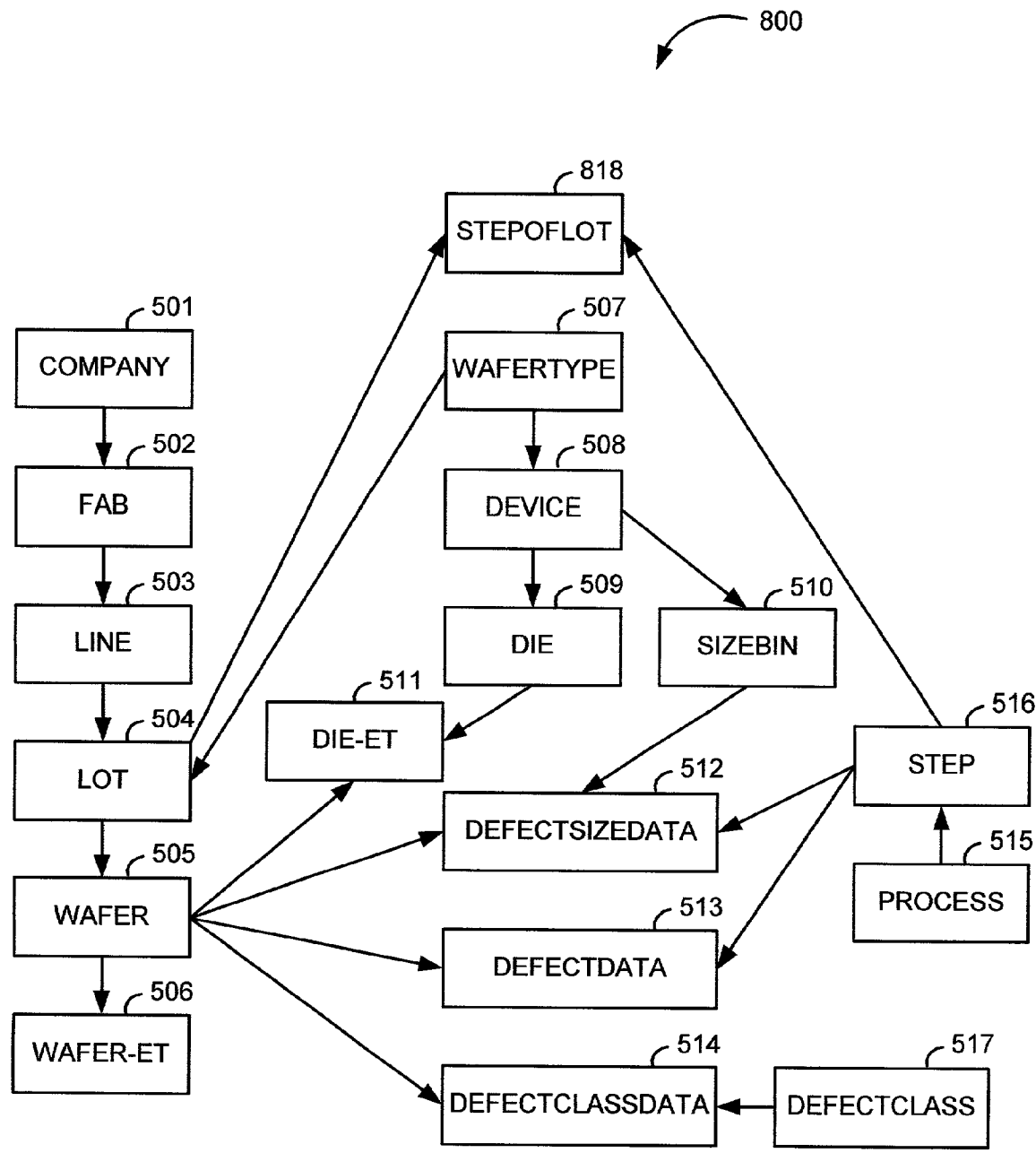
FIG. 8 illustrates, as a slightly more complex example than FIG. 5, another dependency graph depicting relationships between tables for a database schema.
Figure 9:
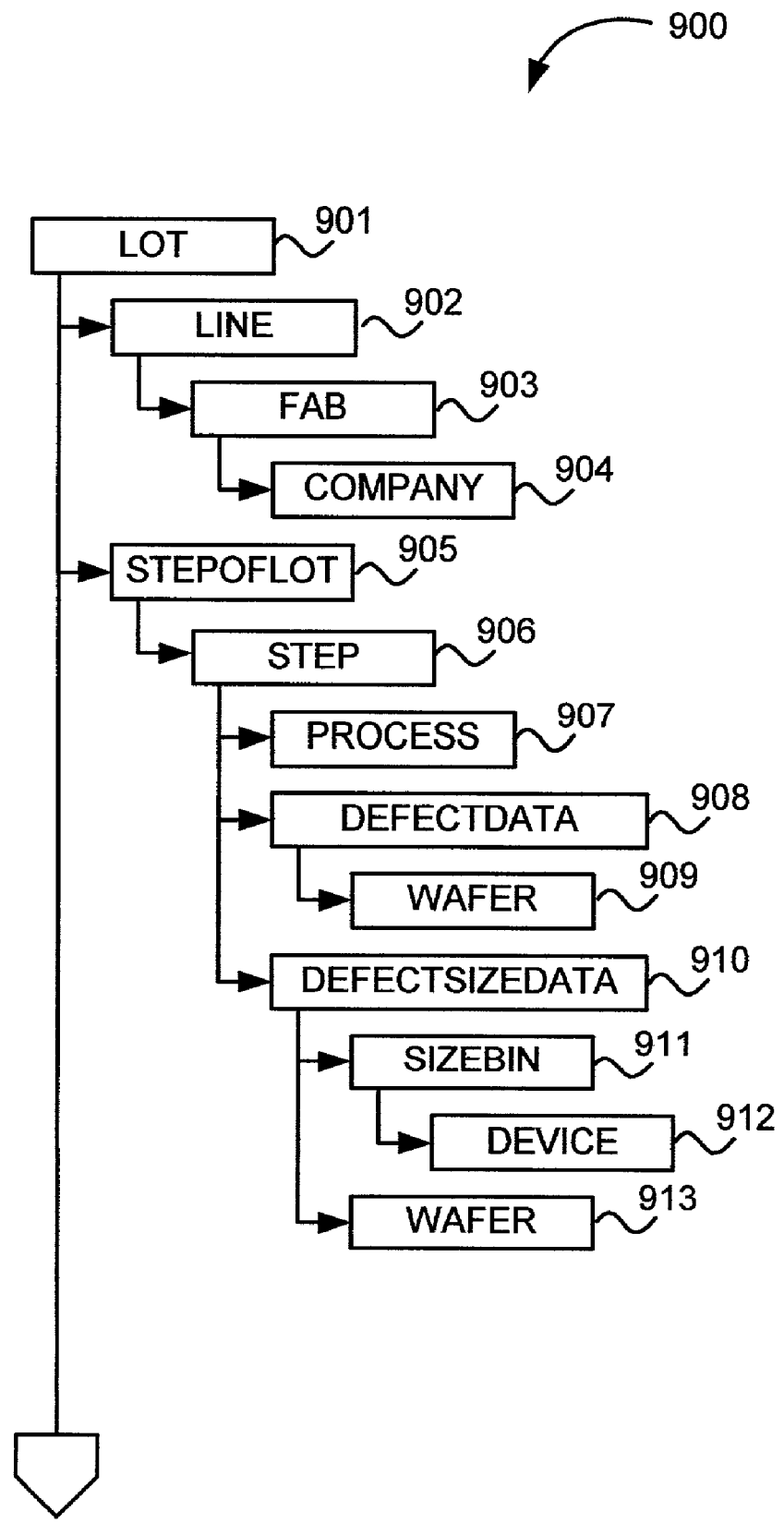
FIGS. 9 and 10 illustrate, as an example in two parts, a hierarchical representation for the database schema of FIG. 8 resulting from expert knowledge of its table usage for database queries.
Figure 10:
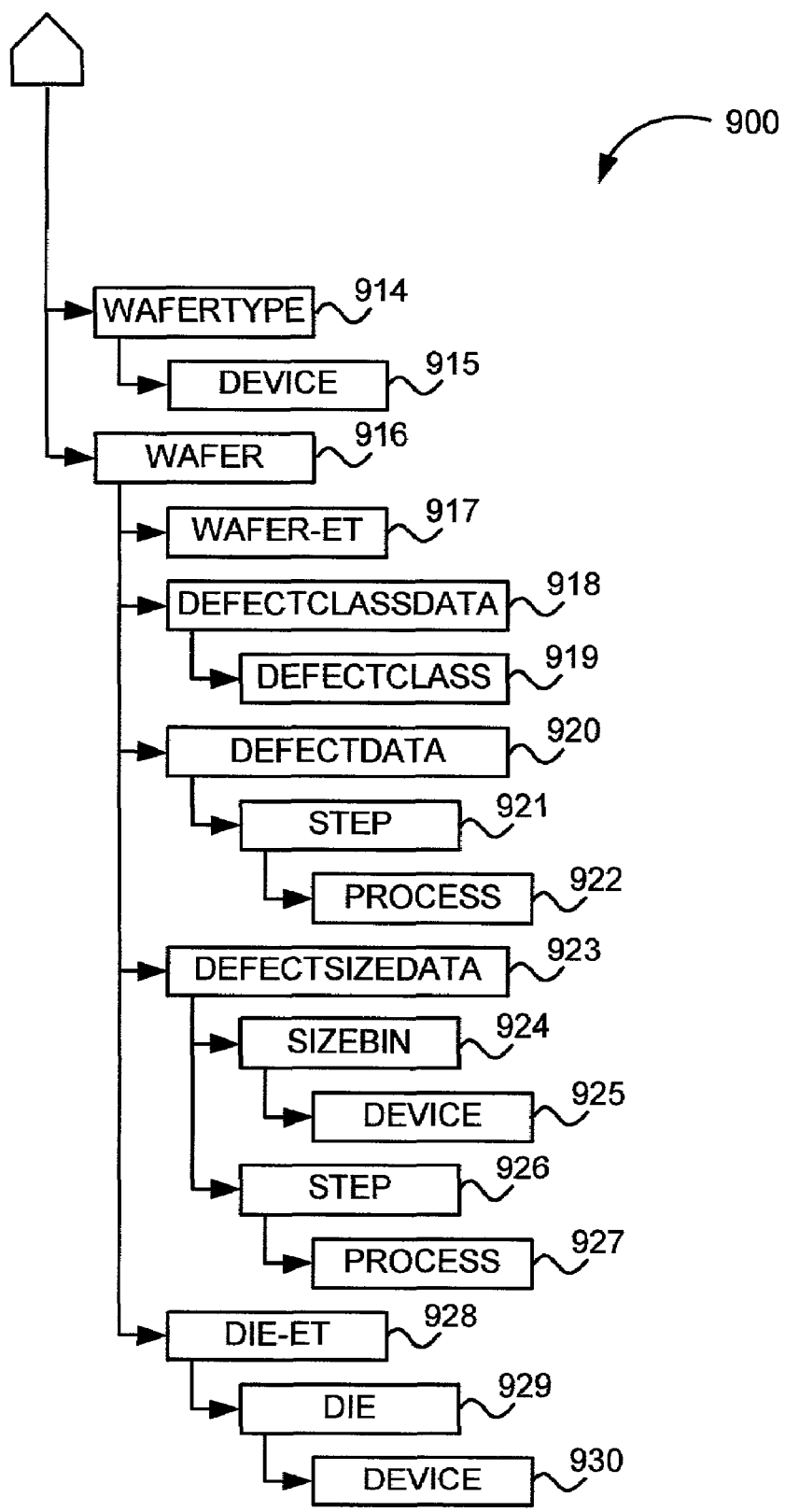

To better illustrate the power of the method for automatic generation of join graphs for relational database queries, it is instructive to look at a slightly more complex example. The following example employs information from the database schema depicted in FIG. 8, and its preferred hierarchical representation depicted in FIGS. 9 and 10. FIG. 8 illustrates a dependency graph that is identical to that of FIG. 5, except for an added table STEPOFLOT 818. Correspondingly, FIGS. 9 and 10 illustrate a hierarchical representation that is identical to that of FIG. 7, except for an additional branch including instances 905~913 that results from the added table STEPOFLOT 818 in FIG. 8.

Now repeating the first example for the modified database schema and hierarchical representation, in 101 of FIG. 1, an input set containing the tables named LOT, WAFER, STEP and DEFECTDATA is again received. In 102, the table LOT is the first table selected from the input list for processing. Since the table LOT has only one instance 901 in the hierarchical representation 900, in performing 104 of FIG. 1, the instance 901 is marked. Since the instance 901 of the table LOT has no ancestors in the hierarchical representation 900, there are no ancestors to be marked in 104. In 108, it is determined that the table LOT is not the last table in the input list, so the method jumps back to 102 and selects the table WAFER to be processed.

In 103, the table WAFER is determined to have three instances, 909, 913 and 916, in the hierarchical representation 900. Therefore, the method processes the table through 105 instead of 104 in this case. In 105, the table WAFER is determined to be a one-dimensional table according to the dependency graph 800 since it depends only from the table LOT. Accordingly, in 106, the table name of the table WAFER is added to the one-dimensional list. In 108, it is determined that the table WAFER is not the last table in the input list, so the method jumps back to 102 and selects the table STEP to be next processed.

In 103, the table STEP is also determined to have three instances, 906, 921 and 926, in the hierarchical representation 900. Therefore, the method also processes the table through 105. In 105, the table STEP is also determined to be a one-dimensional table according to the dependency graph 900 since it depends only from the table PROCESS. Accordingly, in 106, the table name of the table STEP is added to the one-dimensional list. In 108, it is determined that the table STEP is not the last table in the input list, so the method jumps back to 102 and selects the table DEFECTDATA to be next processed.

In 103, the table DEFECTDATA is determined to have two instances, 908 and 920, in the hierarchical representation 900. Therefore, the method processes the table through 105. In 105, the table DEFECTDATA is determined to be a multi-dimensional table according to the dependency graph 800 since it depends on the tables WAFER and STEP. Accordingly, in 106, the table name of the table DEFECTDATA is added to the multi-dimensional list. In 108, it is determined that the table DEFECTDATA is the last table in the input list, so the method now proceeds to 109.

In processing the tables of the input list through 102~108, only the table name for the table DEFECTDATA was added to the multi-dimensional list, and the table names for the tables WAFER and STEP was added to the one-dimensional list. Therefore, the method first proceeds to 109 of FIG. 1, which is detailed in 201~207 in FIG. 2 with its 207 further detailed in 301~305 in FIG. 3, to process the multi-dimensional list including only the table DEFECTDATA. Then the method proceeds to 110 of FIG. 1, which is detailed in 401~405 of FIG. 4, to process the one-dimensional list including the tables WAFER and STEP.

In 201, the table DEFECTDATA is selected from the multi-dimensional list. In 202, it is determined that there is no instance of the table DEFECTDATA that is marked in the hierarchical representation 900. In 204, it is determined that the instance 920 of the table DEFECTDATA is the closest child in relationship to a marked instance, in this case, the instance 901 for the table LOT. The determination in this case is straightforward since the instance 920 of the table DEFECTDATA is only once removed from the instance 901 of the table LOT (through the instance 916 of the table WAFER), whereas the instance 908 of the table DEFECTDATA is twice removed from the instance 901 of the table LOT (through the instance 905 of STEPOFLOT and the instance 906 of the table STEP). Accordingly, in 205, the instance 920 of the table DEFECTDATA is marked, and its ancestors according to the hierarchical representation, instances 916 and 901 respectively for the tables WAFER and LOT are also to be marked. Since instance 901 of the table LOT has already been marked, only the instance 916 for the table WAFER needs to be marked at this time.

In 206, a dimensions list is generated for the current multi-dimensional table DEFECTDATA. The dimensions list includes all dimensions for the table DEFECTDATA, as determined from the dependency graph 800 of FIG. 8, excluding its parent table in the hierarchical representation 900 of FIGS. 9 and 10, which in this case is the table WAFER.

Referring to FIG. 8, the table DEFECTDATA 513 is shown dependent upon tables WAFER 505 and STEP 516. Since the dimensions list excludes the table WAFER, in 206, only the table name for the table STEP is included in the generated dimensions list. Processing of 207 is then performed by 301~305. In 301, the table STEP is selected from the dimensions list. In 302, it is determined that the table STEP is also in the one-dimensional list. Accordingly, the process moves on to 304. In 304, the instance of the table STEP having an instance of the table DEFECTDATA is to be marked. By inspection of the hierarchical representation, it is apparent that the instance 921 of the table STEP is the only instance of the table STEP that has an instance of the table DEFECTDATA as a parent. Therefore, the instance 921 of the table STEP is marked in this case. In 305, the table name for the table STEP is then removed from the one-dimensional list. In 303, it is determined that the table STEP is the last (and only) dimension in the dimensions list, so the process goes back to 203 in FIG. 2.

In 203, it is then determined that the table DEFECTDATA is the last (and only) table in the multi-dimensional list, so the process goes back to 110 in FIG. 1. Processing of 110 is then performed by 401–405 of FIG. 4. In 401, the table WAFER is selected from the one-dimensional list. At this point, it is also the only table name left in the one-dimensional list since the table name for the table STEP has now been removed. In 402, it is determined that the instance 916 of the table WAFER has already been marked while performing 205 above. Accordingly, the process proceeds to 403. In 403, it is determined that the table WAFER is the last (and only remaining) dimension in the dimensions list, so the process goes back to 111 in FIG. 1.

In 111, the join graph is then generated as being the chain of tables represented by instances 901, 916, 920 and 921 in the hierarchical representation 900. Note that these are the same tables being linked in each of the examples above (i.e., LOT, WAFER, DEFECTDATA and STEP). Thus, even though a table STEPOFLOT had been added to the database schema in the more complex example, the method provides the same results for the same database query. The real power of the algorithm can be seen on complex and extensive databases that include hundreds of tables. The samples used here are just to illustrate the method. A major advantage of the method and its distinction from other conventional methods is the usage of the expert knowledge in the form of the hierarchical representation of the database schema.

Although the various aspects of the present invention have been described with respect to a preferred embodiment, it will be understood that the invention is entitled to full protection within the full scope of the appended claims.

I claim:

1. A method for automatic generation of a join graph for a relational database query, comprising:

receiving an input list that includes a plurality of tables for inclusion in said join graph, at least one attribute of interest wherein said attribute may be used for at least one function selected from the group consisting of output and filtering;

determining whether each of said plurality of tables is a single instance;

marking each of said plurality of tables determined to be single instance and each table that is an ancestor of each of said plurality of tables determined to be single instance for inclusion in said join graph;

determining whether each of said plurality of tables is a multi-dimensional table wherein a multi-dimensional table is a table directly dependent from at least two other tables in said relational database;

inserting each of said plurality of tables determined to be a multi-dimensional table in a multi-dimensional table list;

determining whether each of said plurality of tables is a one-dimensional table wherein a one-dimensional table is a table directly dependent from one other table in said relational database;

inserting each of said plurality of tables determined to be a one-dimensional table in a one-dimensional table list;

marking an instance of each table in said multi-dimensional list closest to a marked table in a hierarchal representation of said relational database and each ancestor of said instance;

generating a dimension list for each table in said multi-dimensional list including each reference table for a particular table;

determining whether each table in each dimension list is included in said one-dimensional list;

marking each instance of each table in each dimension list having a multi-dimensional table as a parent and removing said each table from said one-dimensional table list responsive to a determination that said each table is in said one-dimensional list; and determining whether each table in said one-dimensional list is unmarked;

determining for each of said table in said one-dimensional list determined to be unmarked a closest instance to a marked table in said hierarchal representation of said relational database and each ancestor of said instance; and generating a join graph from said marked instances of tables in said hierarchal representation of said relational database and said at least one attribute.

* * * * *